Sept. 23, 1958  L. NUTTING  2,853,387
COFFEE CONCENTRATE AND PROCESS OF PRODUCING SAME
Filed July 14, 1951  4 Sheets-Sheet 1
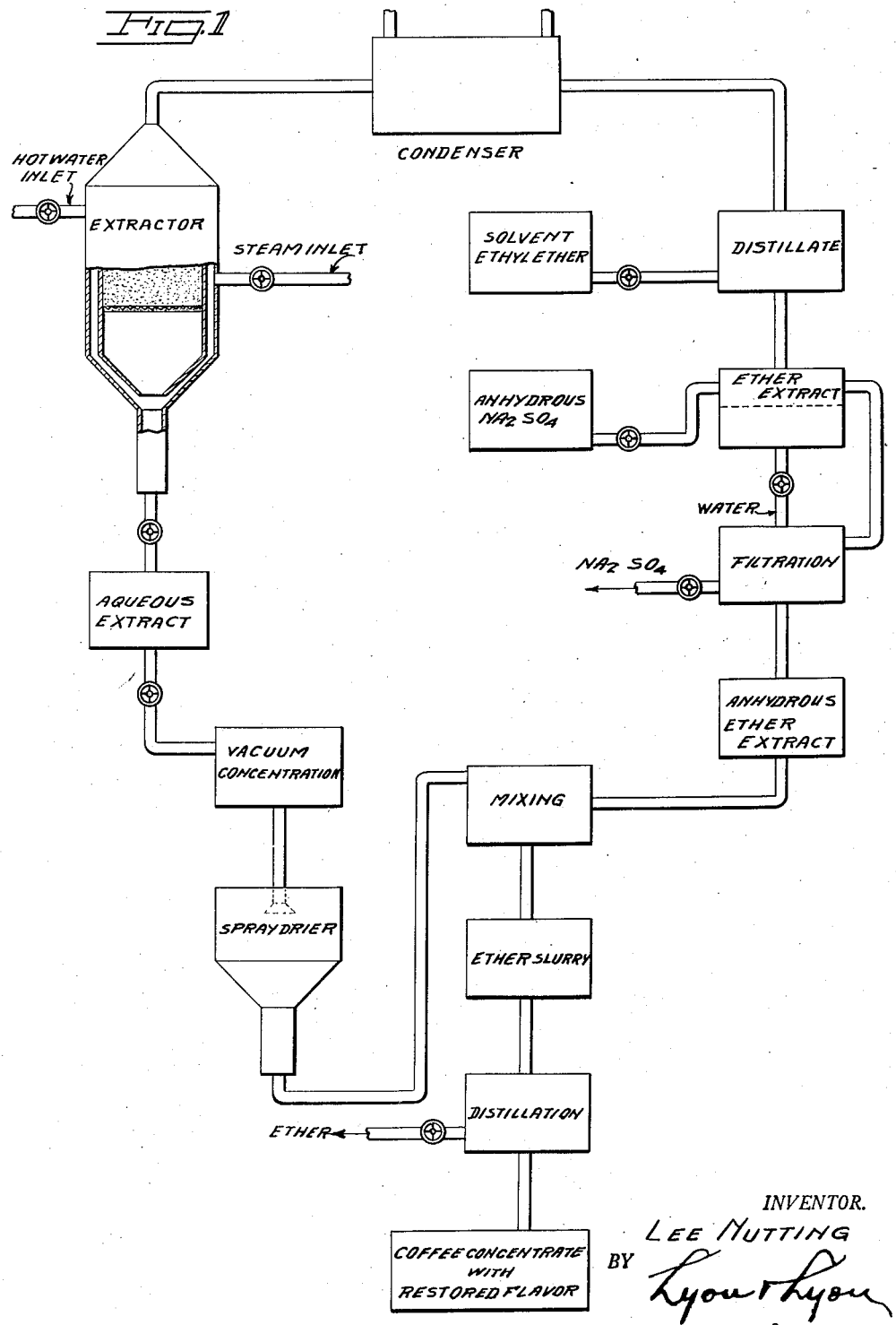
INVENTOR.
LEE NUTTING
BY
ATTORNEYS

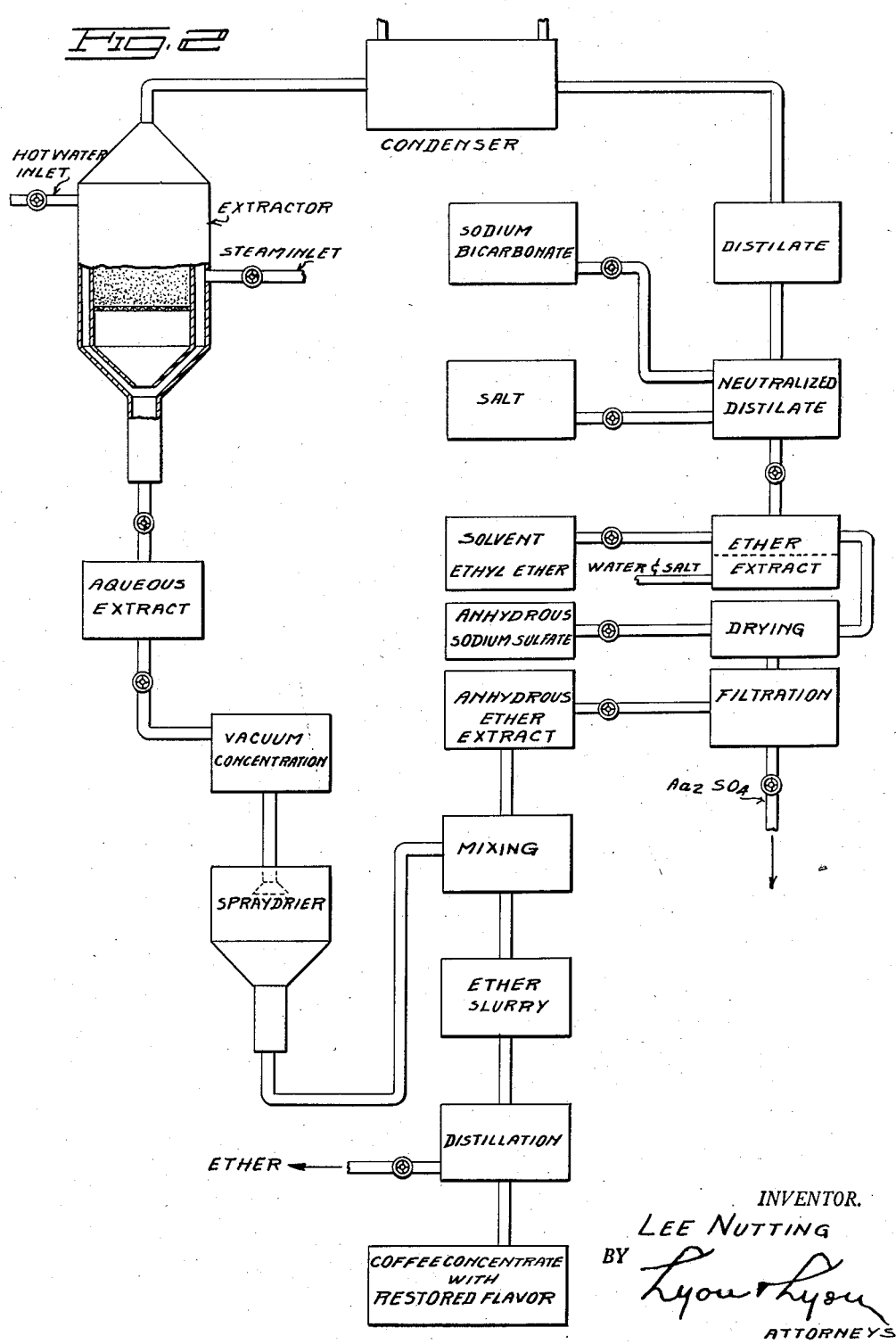

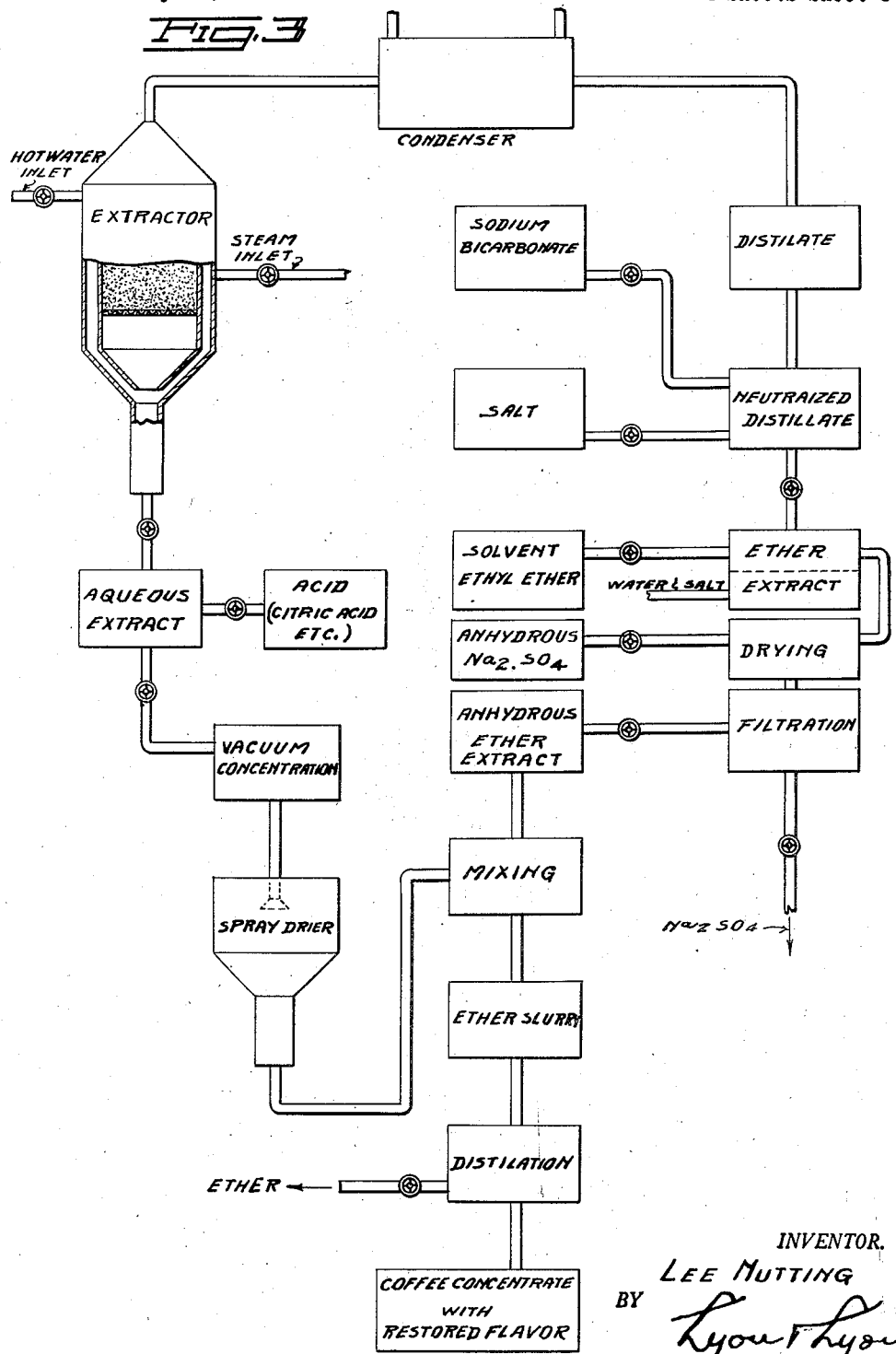

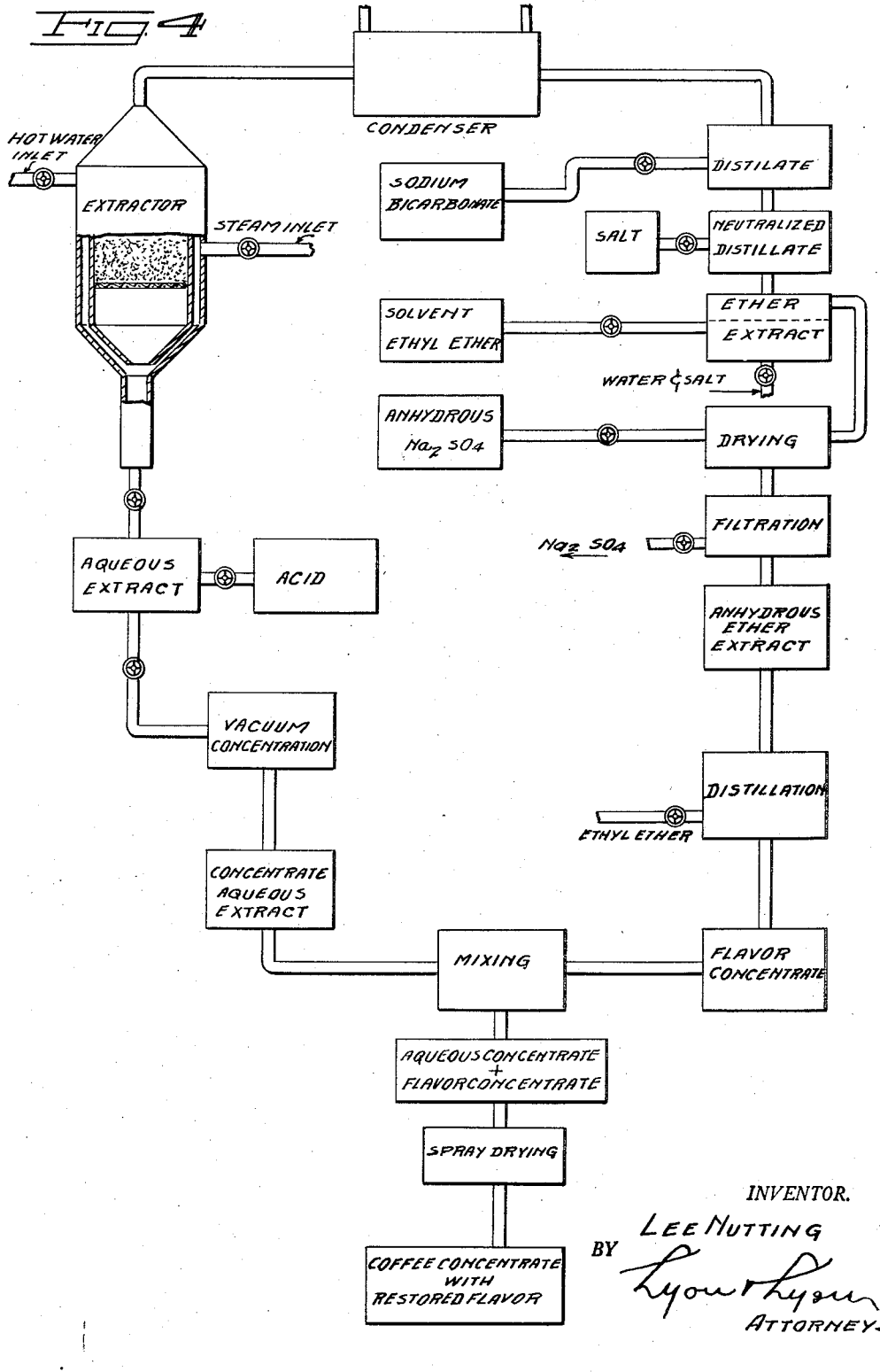

United States Patent Office 2,853,387
Patented Sept. 23, 1958

2,853,387

COFFEE CONCENTRATE AND PROCESS OF PRODUCING SAME

Lee Nutting, Berkeley, Calif., assignor to Hills Bros. Coffee, Inc., San Francisco, Calif., a corporation of California Application July 14, 1951, Serial No. 236,713

9 Claims. (Cl. 99—71)

This invention relates to coffee concentrates and to the process of producing the same. This invention deals with the volatile flavoring matters of coffee, the body material of the coffee extraction, and to the production of a new flavoring matter concentrate.

In my copending application, Serial No. 749,049, entitled Process of Preparing a Coffee Concentrate, filed May 19, 1947, now Patent No. 2,562,206, of which application the present application is a continuation-in-part, I have set forth a process of preparing a coffee concentrate, and the invention of this application is directed to improvements in the process therein set forth and to the production of a separated volatile flavoring concentrate.

In the processing of coffee to produce a full flavored coffee concentrate, I have found that the flavoring values of the coffee which are separated therefrom are not only small in quantity, but are unstable in the presence of water as separated. To prepare a satisfactory concentrate it is desirable to be able to adjust the relationship of body material to volatile flavoring matter to meet the conditions of taste and use to correspond with the flavor desires of different parties and sections of the consuming public. It is also desirable that such relationship be made adjustable so that a standard product may be produced from varying roasts and blends of coffee to meet such flavor requirements as exist.

It is therefore the object of my invention first to provide a method of separating volatile flavoring matter from fresh roasted ground coffee so as to obtain the maximum of such volatile flavors and second to provide a new volatile flavoring concentrate which is relatively stable and applicable for use for combining with a separately separated body material so as to produce either a standard flavor value concentrate or a variation in the relationship of the body material and the flavoring values of the coffee concentrate to meet the requirements of particular uses.

Another object of my invention is to provide a method of producing a volatile flavoring matter concentrate which is stable and may be kept and utilized in a process of preparing a full flavored coffee concentrate.

Another object of my invention is to provide a method or process of stabilizing the volatile flavoring matters extracted from roasted ground coffee.

Another object of my invention is to provide a method of producing a full flavored coffee concentrate wherein the composition of the coffee concentrate is controlled to produce a coffee brew having a determined pH value.

Another object of this application is to set forth and describe fully a series of variable processes and products which may be produced in accordance with my invention so that those skilled in the art will be able to adjust the process carried out to meet the particular desires and requirements of the desired concentrate to be produced.

Another object of this invention is to provide a series of processes of producing full flavored coffee concentrates of dry form in each of which processes or methods the volatile constituents obtained from the wet steaming of the coffee are so processed as to reduce the liability of flavor loss both through the handling of the volatile condensate and through the volatilization of water both from the condensate and through the processing of the body material and condensate to produce the relatively dry coffee concentrate powder.

The processes of my invention are diagrammatically illustrated in the accompanying drawings in which Figure 1 is a diagrammatic flow sheet of a process embodying my invention.

Figure 2 is a second diagrammatic flow sheet of the modified form of the process embodying my invention.

Figure 3 is a third diagrammatic flow sheet of a further modified form of process embodying my invention.

Figure 4 is a fourth diagrammatic flow sheet of a further modified form of the process embodying my invention.

I have discovered several essentials to the production of a full flavored powdered coffee concentrate which have enabled me to produce a full flavored coffee concentrate and have enabled me to maintain a variable in the process of production while retaining such full flavored value of the ultimate product, all of which I believe will be apparent in the hereinafter set forth description of my invention through its several modifications as the same are illustrated in the accompanying flow sheets.

As coffee is processed in accordance with my copending application, Serial No. 749,049, the freshly roasted ground coffee is processed to produce two separated fractions, these being the volatile flavoring matters and the body material. The body material is rather stable and may be subjected to rather strenuous processing without great damage. The volatile flavoring material separated in the presence of water has little stability and is subject to rapid deterioration and loss. When the economies of carrying out the process are correct and the balance between body and flavoring matter in the freshly roasted coffee is precise, the process of my copending application may be followed with the production of a very satisfactory powdered coffee concentrate. When, however, it is desired or necessary for any reason to adjust the relationship between body material and volatile flavoring matters in the ultimate dry concentrate, there is no way by which such adjustment can be satisfactorily made in accordance with the disclosure of my aforesaid copending application.

In a large scale application of my copending application if it is desired to adjust the relationship of body material to volatile flavoring matters, or it would be for any reason necessary to carry over the processing due to a lapse of time in operations, there is no way in which such a process could be carried out without loss of either one of the two products produced, principally the volatile flavoring matters. I have therefore discovered a method by which I am able to stabilize the volatile flavoring matters in order to enable the relationship of the two flavoring values to be adjusted as desired or required either to produce a standardized product or one which may be varied in order to meet the taste requirements of varying portions of the public.

The process which I utilize to carry out this discovery is set forth in the accompanying flow sheets and enables me to produce first a volatile flavoring matter concentrate having stability which may be retained in anhydrous form or may be retained in anhydrous neutralized form so that it may be subsequently incorporated in the body material under such conditions as may be deemed ideal for carrying out the particular process of concentrates required.

Referring first to the process of Figure 1, the roasted ground coffee is separated into a flavor and a body material portion in precisely the manner set forth in my copending application, Serial No. 740,049. In that application the freshly roasted and ground coffee is subjected to a wet steam distillation with the steam preferably at or near atmospheric pressure so that the coffee is first wetted to release the volatile flavoring matters which are then carried away with the steam on subsequent passing of steam through the bed of roast ground coffee. The steam is then condensed to form a distillate of steam and volatile flavoring matters. The amount of condensates so collected is determinate of certain variables of the process. It is of course preferable that the steam distillation be caried on for a period of time necessary to extract all the volatile flavoring materials, including such volatile acid constituents as may be separated by this steam process.

The steam extracted coffee grounds are then treated with hot water in such manner as to steep, percolate, or otherwise separate from the ground roasted coffee those materials which are either water soluble or water dispersible to produce an aqueous extraction of the body materials. This process is carried out in such manner as to utilize a minimum of water consistent with the economics of the process in separating the body materials from the ground roasted coffee.

In accordance with my copending application above referred to, the aqueous extraction is then concentrated, preferably by vacuum evaporation, to a point where the solid contents of the aqueous extraction are sufficiently high to enable the reintroduction of the steam distillate so that upon subsequent drying of the mixed fractions, little flavoring value is lost. There is thus produced a dry coffee concentrate of full flavoring value. By dry as used in this application, I do not mean dry in the chemical sense, but merely a powder which has the appearance to the eye of being substantially dry.

This process is satisfactory where there is a maintainable and desired balance between body material of the ground roasted coffee and the volatile flavoring matter extracted therefrom. It is also satisfactory where no condition of operation is reached requiring the discontinuance of the process where the steam distillate would be required to be retained for a period of time before reincorporation with the body material.

In accordance with the present invention I then proceed prior to reincorporation of the steam distillate with the body material to stabilize the steam distillate so that its time or manner or reincorporation with the body material may be such as good judgment dictates. Thus the steam distillate, in accordance with the process of Figure 1, is extracted with ethyl ether which has been previously distilled to remove all non-volatile impurities therefrom which might remain in the separated flavoring matters of the steam distillation.

The solvent which I have herein set forth is ethyl ether which is purified by distillation to remove therefrom all constituents which might remain in the flavoring matter of the coffee concentrate. Any other suitable solvent free of non-volatile impurities may be utilized such, for example, as propyl ether.

The adding of the ethyl ether to the steam distillate results in the flavoring matters being dissolved in the ethyl ether so that I am able to make a physical separation of the water and ether containing the flavoring matters by any suitable process well known to the art such as by decantation. I then have an ether extract which, however, carries with it some water. It is then found desirable in order that the flavoring matters have the highest stability, to remove the water which is carried over with the ether extract of the volatile flavoring materials. To accomplish this I may utilize any suitable anhydrous medium such, for example, as anhydrous sodium sulphate, which is added to the ether extract to dehydrate the same and the resultant sodium sulphate is removed from the ether extract by filtration. I have thus produced an anhydrous ether extract of the steam distillation of volatile flavoring which shows a deterioration rate over a period of hours as compared with the steam distillate of flavoring matter which has a deterioration rate measurable in minutes.

The anhydrous ether extract may then be reincorporated in the body material to produce the dry coffee concentrate powder in any suitable manner. As illustrated in the flow sheet of Figure 1, the body material aqueous extraction may be first vacuum concentrated to the desired point of solid content and then spray dried to produce a dry powder. This dry powder is then mixed with the anhydrous ether extract to produce a slurry of the body material and volatile materials of the coffee, the ether in this case serving as a medium of dispersing the volatile flavoring matters throughout the body material. After forming the slurry the ether is then distilled away so that it may be recovered for future use, leaving the dry coffee concentrate with restored flavor values.

The water containing concentrate of the body material has a relatively high ionic strength so that the same does not mix readily with the ether solution of volatiles. It is for this reason that the process as above set forth is suggested for incorporating the anhydrous ether extract by forming a slurry with the dry body material. As differentiating from the process of my copending application, this process does not reincorporate the volatile flavoring matters into the body materials in such manner as to enable the body materials to exercise their greatest protective ability over the volatile flavoring matters.

In accordance with the process of Figure 2, precisely the same process is followed with the addition of the further step of neutralizing the steam distillate with a suitable agent such, for example, as sodium bicarbonate to neutralize the acid content of the steam distillate prior to ether extraction. In this step it is also found that by the addition of a quantity of suitable salt with the sodium bicarbonate that the neutral salts formed by the reaction of the sodium bicarbonate with the acid of the steam distillate are more readily separable from the ether soluble flavor constituents. By neutralization as above set forth, I mean adjusting the pH of the steam distillate to a condition in which the same has a pH value of approximately 6. In this neutralization step care should be taken to avoid raising the pH value beyond neutrality, or of a pH value of 7, as I have found that to carry the same beyond this point produces an apparently irrevocable flavor destruction.

The steam distillate with the adjusted pH is then extracted with ethyl ether and dehydrated with anhydrous sodium sulphate substantially as set forth in the process of Figure 1. In this case there is produced an anhydrous ether extraction of the distillate with the pH adjusted toward neutrality. This ether extract so produced is substantially free from volatile acids and has a deterioration rate measurable in days compared with the less stable ether extract of volatile flavoring matters, prepared from the distillate the pH of which was not adjusted prior to ether extraction.

This anhydrous ether extract, which does not contain volatile acids, may be used in any desired manner, either to adjust the flavor relation of the ultimate dry concentrate with the flavor values of the aqueous extraction of the coffee, or to fortify any aqueous extraction where desired, or may be satisfactorily carried over through periods of necessary shutdown of the process to restore the volatile flavoring matters which might otherwise be lost.

The anhydrous ether extract prepared from the neutralized distillate is also a separately usable product and may be incorporated in any dry coffee concentrate to restore full flavoring matter thereto.

The pH value of the coffee brew is particularly related to the judgment of flavor value of the entire brew and it has been found that a small variation in pH of the coffee brew will result in a very pronounced change in judgment of the flavoring values of the brew. Thus where, as in the process of Figure 2, the acid values of the coffee have been reduced, I have found that in order to meet such change in flavor judgment as may be influenced by the change of the pH value, that it is desirable to restore the acid removed. This may be done in any suitable manner as, for example, illustrated in the diagrammatic flow sheet of the process shown in Figure 3 by the incorporation of a suitable acid to the aqueous extract prior to vacuum concentration thereof. A suitable acid for such use is citric acid, ascorbic acid, or a volatile acid such as acetic acid may be incorporated in the aqueous extraction after vacuum evaporation to raise a solid content, this being to avoid loss of the acetic acid as far as possible through volatilization during the concentration. It may be preferable where ascorbic acid is used to incorporate this acid in the dry coffee concentrate prior to mixing with the anhydrous ether extract.

I prefer to reincorporate the desired acid in the aqueous extract as above set forth rather than in the anhydrous ether extract because to add the acid to the anhydrous ether extract would increase its rate of deterioration. In this manner I have found it desirable to add such acid as may be required to the aqueous extract so that the resulting brew produced upon addition of water to the dry coffee concentrate will have a pH value of approximately 5, depending somewhat upon the coffee originally utilized in the process.

In Figure 4 I have shown a further modification of the process embodying my invention which reincorporates volatile flavoring matters in the dry coffee concentrate powder produced in such manner as to produce dry coffee concentrate having the greatest flavor maintaining characteristics. In this process the essential difference is that the anhydrous substantially acid free ether extract is distilled to remove the ether leaving a liquid flavor concentrate which is ether- and water-free and which has the greatest flavor retention values. This flavor concentrate which is ether- and water-free is added to the concentrated aqueous extract. The solid content of this concentrated aqueous extract is preferably such that its solid content is between 25 and 60% by weight. It is found that it should be above 25% to exercise its retentive characteristic upon the flavor values of the flavor concentrate. It should not be above 60% solids because of the required fluidity in order to obtain proper mixing of the flavor concentrate with the body material.

The mixed concentrated aqueous extraction and flavor concentrate are then spray dried, producing a coffee concentrate with restored flavoring having the desired adjusted pH and in which the volatile flavorings are so reincorporated with the body material as to produce a coffee concentrate powder which has long-lasting full flavor characteristics.

It will be obvious from the foregoing that the particular conditions of operation selected for use are those which meet the precise conditions desired. The greatest results are obviously obtained by following the process as diagrammatically illustrated in Figure 4. However, a satisfactory product may be produced in accordance with particular conditions without carrying the process to the extremity of the Figure 4 process.

I have herein set forth the best known method of carrying out my invention and my invention is defined in the appended claims.

I claim:

1. A process of preparing a dry coffee concentrate with restored volatile flavoring constituents, including the steps of introducing steam into the ground roasted coffee to wet and to liberate the volatile constituents thereof, condensing the steam and volatiles mixture to form an extract of the volatile constituents of the coffee, neutralizing the extract of the volatile constituents of the coffee, extracting the volatile constituents of the coffee with a solvent to remove the water therefrom, subsequently treating the ground roasted coffee with water to form an aqueous extraction, concentrating the aqueous extraction to reduce the water content thereof, drying the concentrated aqueous extraction and then mixing the solvent extraction with the dry aqueous extraction, and then removing the solvent from the mixture.

2. A process of preparing a coffee concentrate, including the steps of wetting the ground coffee and then extracting the volatile constituents of the coffee to form a small volume of water extract containing said volatile constituents, neutralizing the water extract, separating the water from the neutral volatile constituents with a solvent, passing water through ground coffee to prepare a water extract therefrom, concentrating the latter extract by volatilizing water therefrom, mixing the solvent extract of volatile constituents with the concentrate of the latter extract, and then concentrating the mixture.

3. A process of preparing a full flavored coffee concentrate comprising: obtaining a steam distillate of the volatile flavoring matters separating the body materials with hot water to form an aqueous extract, neutralizing the steam distillate to a pH value of between 6 and 7, extracting flavor matters from the neutralized steam distillate with ethyl ether, dehydrating the ether extraction, removing the ether from the ether extraction to leave a water-free flavor concentrate, concentrating the aqueous extraction to where the same contains 25 to 60% solids, mixing the concentrated aqueous extraction with the flavor concentrate, and drying the mixture.

4. A process of preparing a full flavored coffee concentrate comprising: obtaining a steam distillate of the volatile flavoring matters, separating the body materials with hot water to form an aqueous extract, adjusting the pH of the aqueous extract by adding an edible acid thereto, neutralizing the steam distillate to a pH value of between 6 and 7, extracting flavor matters from the neutralized steam distillate with ethyl ether, dehydrating the ether extraction, removing the ether from the ether extraction to leave a water-free flavor concentrate, concentrating the aqueous extraction to where the same contains 25 to 60% solids, mixing the concentrated aqueous extraction with the flavor concentrate, and drying the mixture.

5. A process of preparing a full flavored coffee concentrate comprising: obtaining a steam distillate of the volatile flavoring matters, separating the body materials with hot water to form an aqueous extract, neutralizing the steam distillate to a pH value of between 6 and 7, adding salt to the neutralized steam distillate to aid in the separation of the flavor constituents from the neutralized steam distillate by extracting flavor matters from the neutralized steam distillate with ethyl ether, dehydrating the ether extraction, removing the ether from the ether extraction to leave a water-free flavor concentrate, concentrating the aqueous extraction to where the same contains 25 to 60% solids, mixing the concentrated aqueous extraction with the flavor concentrate, and drying the mixture.

6. In the process of preparing a full flavored dry coffee concentrate, the steps of separating the volatile flavoring constituents by steam distillate of wet ground coffee, separating an aqueous extraction of the body material of the coffee, neutralizing the steam distillate to a pH value of between 6 and 7, separating the volatile flavoring matters from the steam distillate with a solvent such as ethyl ether, dehydrating the ether extraction with an anhydrous salt and separating the salt therefrom by filtration, distilling off the ethyl ether to provide a flavor concentrate which is water-free, concentrating the aqueous extraction, mixing the concentration of the aqueous extration with the flavor concentrate, and drying the mixture.

7. In the process of preparing a full flavored dry coffee concentrate, the steps of separating the volatile flavoring constituents by steam distillate of wet ground coffee, separating an aqueous extraction of the body material of coffee, neutralizing the steam distillate to a pH value of between 6 and 7, separating the volatile flavoring matters from the steam distillate with added salt to make a brine and using a solvent such as ethyl ether, dehydrating the ether extraction with an anhydrous salt and separating the salt therefrom by filtration, distilling off the ethyl ether to provide a flavor concentrate which is water-free, concentrating the aqueous extraction, mixing the concentration of the aqueous extraction with the flavor concentrate, drying the mixture, and adding an edible acid to the aqueous extraction prior to mixing with the flavor concentrate to adjust the pH value of a brew prepared from the dry coffee concentrate when mixed with water to a pH value of approximately 5.

8. A process of preparing a coffee flavor concentrate including the steps of introducing steam into the ground roasted coffee to wet and to liberate the volatile constituents thereof, condensing the steam and volatiles mixture to form an extract of the volatile constituents of the coffee, neutralizing the extract of the volatile constituents of the coffee, extracting the volatile constituents of the coffee from said extract with a solvent to form an anhydrous extract, and then removing the solvent from said anhydrous extract.

9. A process of preparing a coffee flavor concentrate from ground coffee comprising: obtaining a steam distillate of the volatile flavoring matters from the ground coffee; neutralizing the steam distillate to a pH value of between 6 and 7, extracting flavor matters from the neutralized steam distillate with ethyl ether, dehydrating the ether extraction, and removing the ether from the ether extraction to leave a water-free flavor concentrate.

References Cited in the file of this patent

UNITED STATES PATENTS

| | | |
|---|---|---|
| 439,318 | Barotte | Oct. 28, 1890 |
| 1,123,827 | Whitaker et al. | Jan. 5, 1915 |
| 1,123,828 | Whitaker et al. | Jan. 5, 1915 |
| 1,251,359 | Etaix | Dec. 25, 1917 |
| 1,367,716 | Pratt et al. | Feb. 8, 1921 |
| 2,098,961 | Fronmuller | Nov. 16, 1937 |
| 2,345,378 | Brandt | Mar. 28, 1944 |
| 2,562,206 | Nutting | July 31, 1951 |

FOREIGN PATENTS

| | | |
|---|---|---|
| 2,013 | Great Britain | 1913 |
| 289 | Australia | July 13, 1926 |